United States Patent Office

3,641,100
Patented Feb. 8, 1972

3,641,100
PROCESS FOR THE MANUFACTURE OF ACRYLONITRILE
Keisho Yamada, Shigeki Nagai, Kyoji Odan, Yasuo Nakamura, and Mikio Hidaka, Ube-shi, Japan, assignors to Ube Industries, Ltd., Yamaguchi-ken, Japan
No Drawing. Filed Mar. 5, 1969, Ser. No. 804,656
Claims priority, application Japan, July 2, 1968, 43/45,614; July 12, 1968, 43/48,414
Int. Cl. C07c 121/02
U.S. Cl. 260—465.3                         1 Claim

ABSTRACT OF THE DISCLOSURE

In the process of manufacturing acrylonitrile wherein propylene, ammonia and oxygen are contacted with a solid oxidizing catalyst in the vapor phase at a temperature in the range of 400–600° C., the improved method which comprises using as said solid catalyst a catalyst which consists essentially of
 (A) a bismuth antimonate in which the atomic ratio of bismuth to antimony is 1:1, and
 (B) a salt of bismuth selected from the group consisting of a bismuth molybdate in which the atomic ratio of bismuth to molybdenum is 2:3, and a bismuth tungstate in which the atomic ratio of bismuth to tungsten is 2:3;
the weight ratio of said bismuth antimonate to said bismuth molybdate or bismuth tungstate being in the range of 95:5–50:50.

---

This invention relates to a process for the manufacture of acrylonitrile from propylene by ammoxidation and, in particular to a process by which acrylonitrile can be obtained with high selectivity by reacting propylene with ammonia and oxygen in the presence of a catalyst of new composition.

Numerous proposals have been made in the past regarding the method of producing acrylonitrile by the so-called ammoxidation of propylene which invoves the vapor phase oxidation of propylene with either oxygen or air in the presence of ammonia. For example, U.S. Pat. 2,904,580 to Idol discloses a method of manufacturing acrylonitrile by the ammoxidation of propylene using a catalyst selected from the group consisting of the bismuth, tin and antimony salts of phosphomolybdic and molybdic acids and bismuth phospho-tungstate.

However, by-producing such as acetonitrile and cyanic acid are each formed in amounts of about 10% based on the resulting acrylonitrile when the aforesaid catalysts are used. In consequence, not only does the selectivity for acrylonitrile decline (the maximum conversion to acrylonitrile on a carbon basis according to the hereinbefore mentioned U.S. patent was 52.8%), but it also becomes difficult to manufacture commercially with advantages acrylonitrile of high purity by separation and removal of the aforesaid by-products from the resulting acrylonitrile.

On the other hand, British patent specification No. 925,495 discloses the use in the ammoxidation of propylene of a catalyst which contains essentially only the elements bismuth and tungsten in chemical combination with oxygen. However, in the case also of the catalyst used in this method, for example, bismuth tungstate, the formation of such by-products as acetonitrile and cyanic acid was great, and hence the object of obtaining acrylonitrile with high selectivity and high purity was not satisfied.

Thus, as indicated, the catalysts that have been used heretofore in the manufacture of acrylonitrile by the ammoxidation of propylene are generaly low in their selectivity for acrylonitrile and hence are not yet satisfactory from the standpoint of the commercial manufacture of acrylonitrile.

We found that in the case of a catalyst which was obtained by especially choosing a bismuth antimonate in which the atomic ratio of bismuth to antimony is about 1:1 and combining this with either a bismuth molybdate in which the atomic ratio of bismuth to molybdenum is about 2:3 or a bismuth tungstate in which the atomic ratio of bismuth to tungsten is likewise about 2:3, the by-products formed during the ammoxidation of propylene, such as acetonitrile, propionitrile, cyanic acid, acrolein, carbon monoxide and carbon dioxide were controlled to very minute amounts and acrylonitrile was obtained at a high selectivity.

According to the present invention, in the process of manufacturing acrylonitrile by contacting propylene, ammonia and oxygen with a solid oxidizing catalyst in the vapor phase at a temperature of 400–600° C., a method is provided which is characterized in that said oxidizing catalyst consists essentially of:

(A) a bismuth antimonate in which the atomic ratio of bismuth to antimony is 1:1, and
(B) a salt of bismuth selected from the group consisting of a bismuth molybdate in which the atomic ratio of bismuth to molybdenum is 2:3, and a bismuth tungstate in which the atomic ratio of bismuth to tungstate is 2:3, and wherein the weight ratio of bismuth antimonate to either bismuth molybdate or bismuth tungstate is in the range of 95:5–50:50.

The bismuth antimonate, the first component (A) of the present invention is a compound in which the atomic ratio of bismuth to antimony is 1:1 and whose chemical formula is $BiSbO_4$. As antimonates of bismuth there also exist compounds other than the compound of the formula $BiSbO_4$ depending upon the atomic ratio of bismuth to antimony, i.e., compounds having the formulas $Bi(SbO_3)_3$ and $(BiO)_3SbO_4$ are also known. However, the use of such antimonates of bismuth without the scope of the present invention will not bring about the high selectivity for acrylonitrile much as shown by the invention catalyst. Needless to say, the presence as ineffective components in the first component of the invention catalyst of such compounds of the foregoing formulas $Bi(SbO_3)_3$ and $(BiO)_3SbO_4$, in a slight amount, say, less than about 10% by weight based on the $BiSbO_4$ is of no interest at all.

The second component (B) of the catalyst of the present invention is selected from the group consisting of a bismuth molybdate in which the atomic ratio of bismuth to molybdate is about 2:3, i.e. $Bi_2(MoO_4)_3$, and a bismuth tungstate in which the atomic ratio of bismuth to tungsten is also about 2:3, i.e. $Bi_2(WO_4)_3$. These second components can be used not only alone but also in combination. There exist in the case the molybdates of bismuth compounds other than the compound of the formula $Bi_2(MoO_4)_3$ depending upon the atomic ratio of bismuth to molybdenum, i.e., compounds of the formula $Bi_2MoO_6$ and $Bi_6MoO_{12}$ are also known. On the other hand, the existence of compounds other than the compound of the formula $Bi_2(WO_4)_3$ is also known in the case of the tungstates of bismuth depending upon the atomic ratio of bismuth to tungsten, i.e. a compound having the formula $Bi_2WO_6$ exists. However, the use as the second component of the invention catalyst of a bismuth molybdates or tungstate without the scope of the present invention does not conduce to the achievement of a high selectivity for acrylonitrile as demonstrated by the combination catalyst of the present invention. Needless to say, there is no particular harm done even though there are present as ineffective components in a slight amount, say, less than about 20% by weight, based on the $Bi_2(MoO_4)_3$ or $Bi_2(WO_4)_3$ of, respectively, the foregoing bismuth molybdates having the formulas $Bi_2MoO_6$ or $Bi_6MoO_{12}$ or the foregoing bismuth tungstate of the formula $Bi_2WO_6$. From the standpoint of the selectivity for acrylonitrile and the conversion of propylene, the use of bismuth molybdate is to be preferred.

Although the selectivity for acrylonitrile from propylene is low when either of the catalyst components of the invention is used alone, it becomes possible to obtain acrylonitrile from propylene with a high selectivity reaching as high as 90% or more by the use of the combination of these two components. Thus, the proportion in which the bismuth antimonate, the component (A), and either the bismuth molybdate or bismuth tungstate, the component (B), are used is in a weight ratio range of A:B=95:5–50:50, especially preferred being a range of 90:10–70:30.

The invention catalyst can be prepared by the following method. When antimony trichloride is dissolved in concentrated hydrochloric acid and water is then added, hydrolysis takes place to form a precipitate. By the further addition of ammonia water, conversion to antimony trioxide takes place. When a nitric acid solution of bismuth nitrate is added to this antimony trioxide such that the atomic ratio of bismuth to antimony becomes 1:1 and thereafter the mixture is evaporated to dryness until the evolution of nitrogen dioxide ceases followed by calcination, bismuth antimonate is obtained. The calcination is preferably carried out at a temperature usually of 300–700° C., and particularly 540–600° C., for 5–30 hours, and particularly 5–20 hours. A temperature higher than those indicated is not desirable, since the specific surface area of the catalyst declines to result in a decline in the activity of the catalyst.

On the other hand, the bismuth molybdate, the second component of the catalyst to be used in the invention process, can be prepared, for example, in the following manner.

A nitric acid solution of bismuth nitrate is added to an aqueous solution of ammonium molybdate such that the atomic ratio of bismuth to molybdenum becomes 2:3 followed by evaporation to dryness until the evolution nitrogen dioxide ceases and thereafter calcination of the dried product, whereupon is obtained molybdate. The bismuth tungstate, which is also usable as the second ingredient, is prepared by adding a nitric acid solution of bismuth nitrate to an aqueous solution of ammonium tungstate, evaporation of the mixture to dryness until the evolution of nitrogen dioxide ceases and thereafter calcination of the dried product. The calcination of bismuth molybdate and bismuth tungstate is preferably carried out at a temperature usually 300–650° C., and particularly 500–600° C. for 5–30 hours, and particularly 5–20 hours. Temperatures higher than the foregoing range are undesirable, since at such temperatures bismuth molybdate melts, while the specific surface area of bismuth tungstate declines.

The bismuth antimonate and either the bismuth molybdate or bismuth tungstate, which have been obtained as hereinabove described, are prepared in customary manner into the catalyst, using, say a pulverizer to knead the components into paste form with water, following which the paste is molded and dried.

The so obtained catalyst may be used supported on a carrier. As carriers, those which bring about desirable results for the reaction can be used, such, for example, as silica, alumina, alumina-silica, siilcates and Carborundum, which have been inactivated by treatment at elevated temperatures. These can be added to the catalyst in optional amounts, for example, in a range of 10–90% based on the overall weight.

The invention catalysts will vary depending upon the manner of combination of the components and their conditions of preparation, but, generally speaking, they possess specific surface areas of 1–3 m.$^2$/g.

There is no particular restriction as to the size of the catalyst particles, the particle size being suitably chosen in accordance with the conditions of use. Further it is possible to provide the catalyst with adequate mechanical strength by molding it into pellet or granular form by means of the usually employed techniques of molding catalysts. The activity of the catalyst is not affected by the type of the molding method employed.

According to the invention process, except that the hereinbefore described catalyst is used, the ammoxidation of propylene can otherwise be carried out in accordance with the processing conditions which per se are known.

While the propylene used need not necessarily be one whose purity is high, it is best to avoid so far as possible the copresence of such gases, for example, as butenes and acetylenes, which are substantially active under the conditions of the reaction.

The oxygen to be catalytically reacted with the propylene may be pure oxygen gas, but since this need not be of high purity, air may be used instead.

The proportion in which the oxygen is fed to the propylene is suitably in a range of 0.8–3.0-fold molar quantity, and preferably 1.0–2.0-fold molar quantity, of the propylene.

On the other hand, the proportion in which the ammonia is fed to the propylene is suitably in a range of 0.5–3,0-fold molar quantity, and preferably 0.8–1.2-fold molar quantity, of the propylene.

Aside from the propylene, oxygen and ammonia, the use of a diluent gas is also an advantage. As diluent gases, those which are substantially inactive to this reaction, such, for example, as steam, nitrogen, carbon dioxide, ethane, propane, butane and isobutane can be used. A diluent gas of this sort can be used in an amount exceeding 0.5-fold molar quantity of the propylene. Of the diluent gases, steam particularly has not only the action of enhancing the selectivity for the intended acrylonitrile but also the action of prolonging the catalytic activity.

A reaction temperature of 400–600° C. is used, and a temperature of 400–500° C. is especially to be preferred. A contact time of 0.5–40 seconds, and particularly 2–20 seconds, is preferred. On the other hand, as the reaction pressure, atmospheric pressure will do. However, it is also possible to conduct the reaction with an application of a low degree of pressure or under reduced pressure.

Although the invention process can be readily carried out by employing the per se known vapor phase reaction apparatus which use the catalyst as a fixed, moving or fluidized bed, the use of a reaction apparatus of the fixed bed type is of particular advantage from the standpoint of the life of the catalyst.

The recovery of the intended acrylonitrile from the reaction product can be accomplished in the following manner. The effluent gas from the reaction apparatus is contacted with either cold water or other solvents of acrylonitrile to extract the acrylonitrile, following which this is submitted to fractional distillation. It is, of course, possible to treat the effluent gas with an aqueous acid solution, say, aqueous sulfuric acid solution for neutralizing the excess ammonia prior to extraction of the acrylonitrile. According to the invention process, acrylonitrile can be obtained from propylene at a very high selectivity. In addition, the formation of by-products such as acetonitrile, propionitrile, cyanic acid, acrolein, carbon monoxide and carbon dioxide is small. Hence, the purification step can be made much simpler than that of the conventional methods, and furthermore acrylonitrile of high purity can be provided at low cost.

For a better understanding of the invention, the following examples and comparisons are given.

EXAMPLE 1

The catalyst was prepared in the following manner.

116 grams of antimony trichloride was dissolved by adding 12 cc. of hydrochloric acid, after which water was added to effect hydrolysis and formation of a precipitate. 76.7 cc. of ammonia water was then added to convert the precipitate into antimony trioxide which was separated by filtration and water-washed.

This antimony trioxide was placed in an evaporating dish, to which was then added a solution of 246 grams of bismuth nitrate in 46 cc. of nitric acid of 62% concentration, following which this mixture was evaporated to dryness until the evolution of nitrogen dioxide ceased. The solid substance obtained by drying was packed into a U-shaped stainless steel pipe, and the calcination of the substance was carried out for 16 hours at 500° C. by heating the pipe from the outside while flowing air through at the rate of 100 cc. per minute. Bismuth antimonate ($BiSbO_4$) was obtained in this manner.

On the other hand, a solution consisting of 54 grams of bismuth nitrate, 10 cc. of 62% nitric acid and 10 cc. of water was added to a solution consisting of 29.5 grams of ammonium molybdate and 50 cc. of water. This mixture was placed in an evaporating dish and evaporated to dryness until the evolution of nitrogen dioxide ceased. The solid substance obtained by drying was then packed into a U-shaped stainless steel pipe, where it was calcined for 16 hours at 500° C. by heating the pipe from the outside while flowing air through at the rate of 100 cc. per minute. Bismuth molybdate [$Bi_2(MoO_4)_3$] was obtained in this manner.

The bismuth antimonate and bismuth molybdate obtained as described above are mixed in a weight ratio of 80:20 and kneaded into paste form with water using a pulverizer, following which the pasty material was dried for 16 hours at 130° C. The dried material was then screened to 14–20 mesh (Tyler standard sieve) to obtain the catalyst.

Next, the ammoxidation of propylene was carried out in the following manner.

Fifteen cc. of the foregoing catalyst was packed into a U-shaped stainless steel reaction tube having an inside diameter of 16 mm. and the catalyst reaction was carried out at a temperature of 470° C. by flowing therethrough at the rate of 80 cc. per minute a gas mixture of propylene, ammonia, steam and air in a mole ratio of 1:1:1:7.

The contact time was 11.25 seconds.

The conversion of propylene was 64.2% and the selectivity for the several reaction products was as follows:

|  | Percent |
|---|---|
| Acrylonitrile | 91.2 |
| Acetonitrile | 2.1 |
| Cyanic acid | 1.3 |
| Acrolein | 1.1 |
| Propionitrile | 0.3 |

The formation of acetone was not noted.

Comparison 1

The ammoxidation of propylene was carried out under identical conditions as in Example 1, except that the catalyst used in an amount of 15 cc. was one prepared exactly as in Example 1 but without the addition of bismuth molybdate (i.e. $BiSbO_4$ alone screened to 14–20 mesh). The conversion of the propylene was 25.5% and the selectivity for acrylonitrile was 10.9%. The formation of acetonitrile, cyanic acid, acrolein and propionitrile was in trace amounts.

Comparison 2

Example 1 was repeated except that the catalyst used in an amount of 15 cc. was the bismuth molybdate [$Bi_2(MoO_4)_3$] prepared in Example 1, was screened to 14–20 mesh and used alone. The conversion of the propylene was 59% and the selectivity for acrylonitrile was about 65%.

EXAMPLES 2–7

The ammoxidation of propylene was carried out under identical conditions as in Example 1, except that the weight ratio of the bismuth antimonate ($BiSbO_4$) and bismuth molybdate [$Bi_2(MoO_4)_3$] in the catalyst was varied.

The results obtained are shown in Table 1.

TABLE 1

| Example No. | Catalyst $BiSbO_4$ | Catalyst $Bi_2(MoO_4)_3$ | Conversion of propylene (percent) | Acrylonitrile | Acetonitrile | Cyanic acid | Acrolein |
|---|---|---|---|---|---|---|---|
| 2 | 90 | 10 | 45.2 | 80.8 | 3.1 | 0.5 | 2.1 |
| 3 | 85 | 15 | 53.6 | 90.2 | 2.1 | 1.2 | 1.2 |
| 4 | 77 | 23 | 66.2 | 88.6 | 3.5 | 1.1 | 0.5 |
| 5 | 75 | 25 | 65.3 | 84.5 | 1.6 | 1.0 | 0.3 |
| 6 | 70 | 30 | 69.8 | 82.5 | 3.4 | 2.6 | 1.3 |
| 7 | 60 | 40 | 76.6 | 76.5 | 5.3 | 3.0 | 2.5 |

NOTE.—The formation of acetone was not noted. Further, the formation of propionitrile was of a trace order.

Comparison 3

116 grams of antimony trichloride was dissolved by adding 12 cc. of concentrated hydrochloric acid, after which water was added to effect hydrolysis and formation of a precipitate. 76.7 cc. of ammonia water was then added to convert the precipitate into antimony trioxide which was separated by filtration and water-washed.

This antimony trioxide was placed in an evaporating dish, to which was then added a solution of 638 grams of bismuth nitrate in 46 cc. of nitric acid of 62% concentration, following which this mixture was evaporated to dryness until the evolution of nitrogen dioxide ceased. The solid substance obtained by drying was packed into a U-shaped stainless steel pipe, and the calcination of the substance was carried out for 16 hours at 500° C. by heating the pipe from the outside while flowing air through at the rate of 100 cc. per minute. Bismuth antimonate [$(BiO)_3SbO_4$] in which the atomic ratio of bismuth to antimony was 3:1 was obtained in this manner.

This bismuth antimonate [$(BiO)_3SbO_4$] and the bismuth molybdate [$Bi_2(MoO_4)_3$] obtained by the method described in Example 1 was mixed in a ratio of 70:30, and this was used as the catalyst.

When the ammoxidation of propylene was carried out under identical conditions as in Example 1 excepting that this catalyst was used, the conversion of propylene was 53.2% and the selectivity for acrylonitrile was 67.5%.

Comparison 4

A solution consisting of 162 grams of bismuth nitrate, 10 cc. of 62% nitric acid and 10 cc. of water was added to a solution consisting of 29.5 grams of ammonium molybdate and 50 cc. of water. This mixture was then placed in an evaporating dish and evaporated to dryness until the evolution of nitrogen dioxide ceased. The thus dried solid substance was packed into a U-shaped stainless steel pipe and calcined for 16 hours at 500° C. by heating the pipe from the outside while flowing air at the rate of 100 cc. per minute.

Bismuth molybdate ($Bi_2MoO_6$) in which the atomic ratio of bismuth to molybdenum is 2:1 was obtained in this manner.

This bismuth molybdate ($Bi_2MoO_6$) and the bismuth antimonate ($BiSbO_4$) obtained by the method described in Example 1 were mixed in a weight ratio of 70:30 and used as catalyst. When the ammoxidation of propylene was carried out under identical conditions as in Example 1 excepting that this catalyst was used, the conversion of propylene was 48.4% and the selectivity for acrylonitrile was 50.2%.

EXAMPLE 8

The catalyst was prepared in the following manner.

116 grams of antimony trichloride was dissolved by adding 12 cc. of hydrochloric acid, after which water was added to effect hydrolysis and formation of a precipitate. 76.7 cc. of ammonia water was then added to convert the precipitate into antimony trioxide which was separated by filtration and water-washed.

This antimony trioxide was placed in an evaporating dish, to which was then added a solution of 246 grams of bismuth nitrate [$Bi(No_3)_3 \cdot 5H_2O$] in 46 cc. of nitric acid of 62% concentration, following which this mixture was evaporated to dryness until the evolution of nitrogen dioxide ceased. The solid substance obtained by drying was packed into a U-shaped stainless steel pipe, and the calcination of the substance was carried out for 16 hours at 500° C. by heating the pipe from the outside while flowing air through at the rate of 100 cc. per minute. Bismuth antimonate was obtained in this manner.

On the other hand, a solution consisting at 42.7 grams of bismuth nitrate, 40 cc. of 62% nitric acid and 40 cc. of water was added to a solution consisting of 33.7 grams of ammonium tungstate [$(NH_4)_{10}W_{12}O_{41} \cdot 5H_2O$] and 34 cc. of water. This mixture was placed in an evaporating dish and evaporated to dryness until the evolution of nitrogen dioxide ceased. The solid substance obtained by drying was then packed into a U-shaped stainless steel pipe, where it was calcined for 16 hours at 500° C. by heating the pipe from the outside while flowing air through at the rate of 100 cc. per minute. Bismuth tungstate [$Bi_2(WO_4)_3$] was obtained in this manner.

The bismuth antimonate and bismuth tungstate obtained as described above were mixed in a weight ratio of 80:20 and kneaded into paste form with water using a pulverizer, following which the pasty material was dried for 16 hours at 130° C. The dried material was then screened to 14-20 mesh (Tyler standard sieve) to obtain the catalyst.

Next, the ammoxidation of propylene was carried out in the following manner.

Fifteen cc. of the foregoing catalyst was packed into a U-shaped stainless steel reaction tube having an inside diameter of 16 mm., and the catalytic reaction was carried out at a temperature of 470° C. by flowing therethrough at the rate of 80.5 cc. per minute as gas mixture of propylene, ammonia, steam and air in a mole ratio of 1:1:2:7.5.

The contact time was 11.18 seconds.

The conversion of propylene was 63.7% and the selectivity for the several reaction products was as follows:

|  | Percent |
|---|---|
| Acrylonitrile | 85.5 |
| Acetonitrile | 3.2 |
| Cyanic acid | 1.9 |
| Acrolein | 1.5 |

The formation of propionitrile and acetone was of a trace order.

Comparison 5

The ammoxidation of propylene was carried out as in Example 8 using as catalyst the bismuth tungstate $$[Bi_2(WO_4)_2]$$

prepared in Example 8, using it alone after screening it to 14-20 mesh. The conversion of propylene was 26% and the selectivity for acrylonitrile was 48%.

EXAMPLES 9-15

Example 8 was repeated except that the weight ratio of the bismuth antimonate ($BiSbO_4$) and the bismuth tungstate [$Bi_2(WO_4)_3$] in the catalyst was carried.

The results obtained are shown in Table II.

TABLE II

| Example No. | Catalyst | | Conversion of propylene (percent) | Reaction product selectivity (percent) | | | |
|---|---|---|---|---|---|---|---|
| | $BiSbO_4$ | $Bi_2(Wo_4)_3$ | | Acrylo-nitrile | Aceto-nitrile | Cyanic acid | Acrolein |
| 9 | 90 | 10 | 45.7 | 81.1 | 3.0 | 0.5 | 2.1 |
| 10 | 85 | 15 | 59.2 | 82.2 | 3.6 | 3.1 | 1.0 |
| 11 | 77 | 23 | 61.5 | 89.8 | 3.2 | 2.4 | 0.6 |
| 12 | 75 | 25 | 67.5 | 90.6 | 2.0 | 1.3 | 0.8 |
| 13 | 70 | 30 | 66.5 | 88.3 | 3.1 | 1.8 | 1.1 |
| 14 | 60 | 40 | 68.0 | 81.3 | 3.0 | 1.2 | 2.3 |
| 15 | 50 | 50 | 70.2 | 70.6 | 5.6 | 3.6 | 3.1 |

NOTE.—The formation of propionitrile and acetone was of a trace order.

When the foregoing working examples and comparisons are considered, it is apparent that for holding the formation of such byproducts as acetonitrile, cyanic acid, acrolein and propionitrile to a very small amount and obtaining the intended acryonitrile at a high selectivity of 80-90% it is very important that the bismuth antimonate chosen is one in which the atomic ratio of bismuth to antimony is 1:1 and that this bismuth antimonate is used in combination with either a bismuth molybdate or bismuth tungstate in which the atomic ratio of bismuth to either molybdenum or tungsten is 2:3.

This high selectivity for acrylonitrile of the invention catalyst does not substantially change even when the rate of reaction of the propylene is raised, say, to as high as 90%.

We claim:

1. In a process for the production of acrylonitrile by contacting propylene, ammonia and oxygen with a solid oxidizing catalyst in the vapor phase at a temperature of from 400-600° C., the improvement wherein said solid oxidizing catalyst consists essentially of:
   (A) bismuth antimonate of the formula $BiSbO_4$ and
   (B) a salt of bismuth selected from the group consisting of (a) bismuth molybdate of the formula $Bi_2(MoO_4)_3$ and (b) bismuthtungstate of the formula $Bi_2(Wo_4)_3$, the weight ratio of said bismuth antimonate of (A) to said bismuth molybdate or bismuth tungstate of (B) being from 95:5 to 50:50.

References Cited

UNITED STATES PATENTS 3,161,670    12/1964    Adams et al.    260—465.3

JOSEPH PAUL BRUST, Primary Examiner

U.S. Cl. X.R.

252—456, 467; 260—604 R